US008551414B2

(12) United States Patent
Kimura

(10) Patent No.: US 8,551,414 B2
(45) Date of Patent: Oct. 8, 2013

(54) HIGH-VOLTAGE PLASMA PRODUCING APPARATUS

(75) Inventor: Noriaki Kimura, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 393 days.

(21) Appl. No.: 12/531,609

(22) PCT Filed: Mar. 27, 2008

(86) PCT No.: PCT/JP2008/055836

§ 371 (c)(1),
(2), (4) Date: Sep. 16, 2009

(87) PCT Pub. No.: WO2008/123346

PCT Pub. Date: Oct. 16, 2008

(65) Prior Publication Data

US 2010/0040516 A1 Feb. 18, 2010

(30) Foreign Application Priority Data

Mar. 28, 2007 (JP) ................................ 2007-083657

(51) Int. Cl.
*B01J 19/08* (2006.01)

(52) U.S. Cl.
USPC ................ 422/186.29; 422/186; 422/186.04; 204/164; 315/111.21; 313/231.31; 329/346; 329/1

(58) Field of Classification Search
USPC ............... 422/186.29, 186, 186.04; 204/164; 315/111.21; 313/231.31; 329/346, 323
See application file for complete search history.

(56) References Cited

U.S. PATENT DOCUMENTS 6,459,067 B1 10/2002 Vona, Jr. et al.
6,730,277 B2 * 5/2004 Lee et al. ................ 422/186.07

(Continued)

FOREIGN PATENT DOCUMENTS

JP 2002-324698 A 11/2002
JP 2004-154562 A 6/2004

(Continued)

OTHER PUBLICATIONS

Yamamoto et al., "Complete NOx Removal Technology Using Nonequilibrium Plasma and Chemical Process (Performances of Ordinary and Barrier Type Plasma Reactors)", 2000, pp. 243-248, Nihon Kikai Gakkai Ronbunshu 66-646B, The Japan Society of Mechanical Engineers, Japan.

(Continued)

*Primary Examiner* — Xiuyu Tai
(74) *Attorney, Agent, or Firm* — Global IP Counselors, LLP

(57) ABSTRACT

A plasma generating apparatus includes a linear electrode for generating a high voltage by resonance caused when the linear electrode is supplied with an AC signal current, an grounded electrode for defining an internal space spaced from the linear electrode around the linear electrode, and a control device for controlling the power feed to the linear electrode. The control device has a field probe for measuring the electric field in the internal space, and a bandpass filter for filtering the measurement signal into a predetermined frequency band to output an AC signal, a variable phase shifter for shifting the phase of the AC signal so that the AC signal is synchronized with the resonance signal in the internal space when the AC signal is supplied to the linear electrode as a current, and an amplifier for amplifying the AC signal of which the phase is shifted.

7 Claims, 4 Drawing Sheets

(56) References Cited

U.S. PATENT DOCUMENTS

| | | | | |
|---|---|---|---|---|
| 6,899,787 | B2 * | 5/2005 | Nakano et al. | 156/345.44 |
| 7,514,377 | B2 * | 4/2009 | Sato et al. | 438/798 |
| 2003/0059340 | A1 | 3/2003 | Chien et al. | |
| 2004/0065539 | A1 | 4/2004 | Sosnowski | |
| 2004/0134614 | A1 * | 7/2004 | Jevtic et al. | 156/345.43 |
| 2005/0199484 | A1 * | 9/2005 | Olstowski | 204/176 |
| 2006/0257299 | A1 | 11/2006 | Lanz | |

FOREIGN PATENT DOCUMENTS

| | | |
|---|---|---|
| JP | 2004-273312 A | 9/2004 |
| JP | 2005-337200 A | 12/2005 |
| JP | 2006-132483 A | 5/2006 |

OTHER PUBLICATIONS

Okubo et al., "Complete Removal of NOx in Flue Exhaust Gas Using Nonequilibrium Plasma", 2000, pp. 291-292, Nihon Kikai Gakkai 2000 Nendo Nenji Taikai Koen Ronbunshu IV,The Japan Society of Mechanical Engineers, Japan.

European Search Report of the corresponding European Application No. 08738986.2, dated Oct. 31, 2011.

* cited by examiner

HIGH-VOLTAGE PLASMA PRODUCING APPARATUS

CROSS-REFERENCE TO RELATED APPLICATIONS

This U.S. National stage application claims priority under 35 U.S.C. §119(a) to Japanese Patent Application No. 2007-083657, filed in Japan on Mar. 28, 2007, the entire contents of which are hereby incorporated herein by reference.

FIELD OF THE INVENTION

The present invention relates to a high-voltage plasma generating apparatus for generating a plasma using a high voltage of $10^2$-$10^5$V at a high frequency band of e.g., 100 MHz-10 GHz. For example, the present invention relates to an apparatus preferably usable in a variety of fields of e.g., an apparatus for executing an oxidation treatment of NO (nitric oxide) included in the exhaust gas from e.g., a diesel engine.

BACKGROUND ART

The treatment apparatus, using high-voltage plasma in the atmospheric pressure, has been recently proposed for executing an oxidation treatment of NO included in the exhaust gas from e.g., a diesel engine.

When a voltage conversion transformer, often used under a condition of a low frequency band equal to or less than 10 MHz, is used for generating high-voltage plasma, a coiled coil is required to be small in the size and the number of turn thereof. This is because inductance (reactance) should be small at a high frequency wave of 100 MHz or greater. Also, the coil, used as an electric cable, is accordingly required to have small diameter. Consequently, a drawback occurred that large power cannot be supplied. On the other hand, when voltage is set to be large while characteristic impedence is kept to be low (e.g., 50Ω) without executing the aforementioned voltage conversion, power of 10 kW is required for voltage of 1000V ($1000^2 \cdot 50/2=10$ kW), for instance. However, it is actually difficult to provide a power source for supplying the electrical power of the level.

On the other hand, the "Complete NOx Removal Technology Using Nonequilibrium Plasma and Chemical Process (Performances of Ordinary and Barrier Type Plasma Reactors)", 2000, pp. 243-248, *Nihon Kikai Gakkai Ronbunshu* 66-646B, The Japan Society of Mechanical Engineers, Japan proposes a parallel-plates type of high-voltage plasma generating apparatus. The parallel-plates type of the high-voltage plasma generating apparatus is configured to generate plasma in an area between electrodes by applying a high-voltage pulse to the electrodes with the use of an electric oscillator for executing oxidation of NO included in the exhaust gas from e.g., an engine. In this case, the frequency of the high-voltage pulse is several kHz, and the peak voltage thereof is 5000-10000V.

SUMMARY OF THE INVENTION

Technical Problem

However, the aforementioned parallel-plates type of the apparatus has had a drawback that sufficient power is not supplied to the electrodes. This is because a part of the supplied electric power is reflected due to lack of impedance matching, so that enough electric power cannot be fed. Furthermore, for the high-voltage pulses of several KHz, the discharge duration time of a high-voltage pulse takes short, and an interval time until a next high-voltage pulses is followed takes long. In this case, electrons, once ionized from gas, will recombine therewith. It is therefore necessary to provide a great deal of energy for ionizing electrons every time the high-voltage pulse is applied. Consequently, the aforementioned parallel-plate apparatus has had low power efficiency. Because of this, the parallel-plates type of the apparatus also has a drawback that the amount of oxidization-processed NO per unit time turns out to be small for the input power.

In response to this, an object of the present invention is to provide a high-voltage plasma generating apparatus for generating high-voltage plasma usable in e.g., a NO oxidization processing apparatus for solving the aforementioned drawbacks. The high-voltage plasma generating apparatus is capable of efficiently generating high-voltage plasma while reducing the input power less than that of the conventional art.

Solution to Problem

To achieve the aforementioned object, the present invention provides a high-voltage plasma generating apparatus for generating plasma using high voltage of $10^2$-$10^5$V. The apparatus includes a first electrode, a second electrode and a control device. The first electrode receives, as electric power, feeding of an alternating-current signal including a signal component of a predetermined frequency from an electric feeding point, to generate high voltage due to resonance which is occurred upon the feeding of the alternating-current signal. The second electrode is grounded and spaced away from the first electrode and encloses the first electrode, to define a space around the first electrode. The control device is configured to adjust an alternating-current signal including a signal component which is identical to a resonance frequency of the first electrode, to be fed to the first electrode. The control device includes: an electric field probe which measures intensity of an electric field to be generated in the space between the first electrode and the second electrode; a filter which filters a measurement signal from the electric field probe, to obtain an alternating-current signal of a band of the predetermined frequency; a variable phase shifter which shifts a phase of the alternating-current signal to synchronize the alternating-current signal to the resonance of the electric field to be generated in the space when the alternating-current signal is fed to the first electrode as the electric power; and an amplifier which amplifies the phase-shifted alternating-current signal. The control device is configured to feed the amplified alternating-current signal to the first electrode as the electric power to be inputted.

In this case, the control unit desirably further includes an amplitude modulator which modulates amplitude of the alternating-current signal in order to control increase and decrease of the plasma to be generated in the space.

Additionally, the control unit preferably detects the measurement signal outputted from the electric field probe, monitors a condition of the electric field or the generated plasma, and controls at least one of the variable phase shifter and the amplitude modulator in accordance with a monitoring result Furthermore, preferably, the first electrode is a linear electrode elongated in a direction, the space defined by the second electrode is elongated around the first electrode, and separation distance from both ends of the linear electrode to the grounded electrode is shorter than separation distance from other portion of the linear electrode excluding the both ends to the grounded electrode.

Also, the electric feeding point of the linear electrode is preferably out-of-alignment with a longitudinal center position of the linear electrode and an out-of-alignment amount of $x_0$ is represented by the following formula (1):

[Formula 1]

$$\frac{x_0}{2l} = \frac{l}{\pi}\sin^{-1}\left(\sqrt{\frac{\pi Z_{00}}{2QZ_{cr}}}\right) \quad (1)$$

l is half the length of the linear electrode;

$Z_{00}$ is characteristic impedance of an electric feeding line for electrically feeding an electric feeding point;

$Z_{cr}$ is a real number component of characteristic impedance $Z_c$ when the linear electrode is a transmission line.

Here, $Q=1/\chi$

Also, $\chi$ is an coefficient for representing energy loss of equivalent capacitance C in generating plasma in the high-voltage plasma generation apparatus.

Effects of Invention

According to the present invention, the control device has a feedback system configured to filter the measurement signal used for measuring the electric field generated in the space between the first electrode and the second electrode, shift the phase of the alternating-current signal obtained through the filtering, amplify the alternating-current signal, and feeding the amplified alternating-current signal to the first electrode as the alternating-current electric power. With the feedback system, it is possible to adjust the alternating-current signal to be fed in accordance with resonance frequency change caused by plasma generation. In this case, the signal, synchronized with the resonance, is fed as electric power. Therefore, it is possible to easily increase the resonance. Consequently, it is possible to more efficiently generate high-voltage plasma while regulating the input electric power to be lower, compared to a conventional apparatus configured to generate a signal using an oscillator.

Additionally, it is possible to change the duty ratio of an alternating-current signal through the amplitude modulation because the control device is provided with an amplitude modulator configured to execute amplitude modulation of an alternating-current signal to be fed. It is therefore possible to easily regulate increase and decrease of resonance.

Furthermore, when a linear electrode is used as the first electrode, the electric feeding position of the linear electrode is out-of-alignment with the longitudinally center position of the linear electrode. With the out-of-alignment amount of $x_0$ defined by the formula (1), it is possible to configure a system with an impedance matching achieved. Accordingly, it is possible to more efficiently generate high-voltage plasma and regulate the input electric power to be lower than the conventional apparatus.

BRIEF DESCRIPTION OF THE DRAWINGS

FIG. 2B is a cross-sectional view of FIG. 2A sectioned along Arrow B-B' whereas

BEST MODE FOR CARRYING OUT THE INVENTION

A high-voltage plasma generating apparatus of the present invention will be hereinafter explained with reference to a high-voltage plasma generating apparatus 10 illustrated in FIG. 1.

Figure 1:
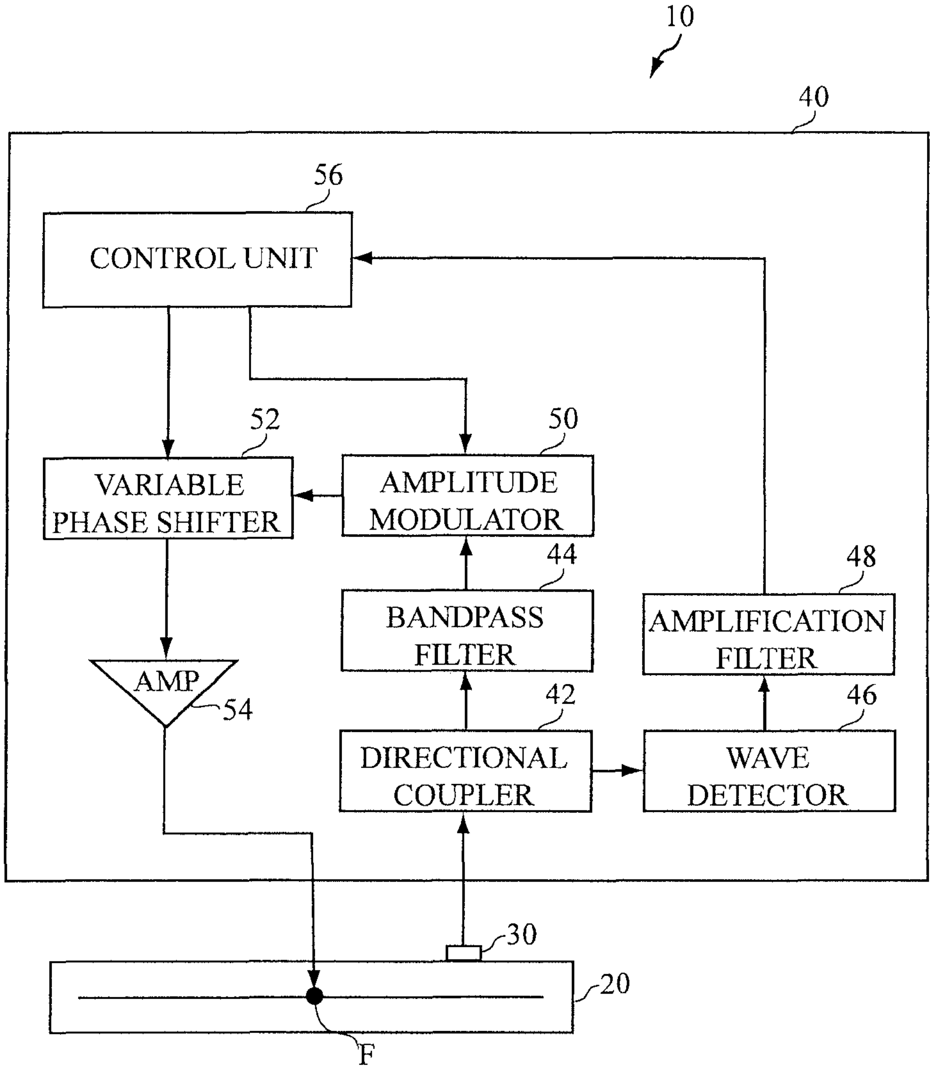
FIG. 1 is a schematic block diagram of an embodiment of a high-voltage plasma generating apparatus according to the present invention.

FIG. 1 is a schematic block diagram of the high-voltage plasma generating apparatus (hereinafter simply referred to as "apparatus") 10.

The apparatus 10 includes a reactor 20 for generating high-voltage plasma and a control device 40.

Figure 2A:
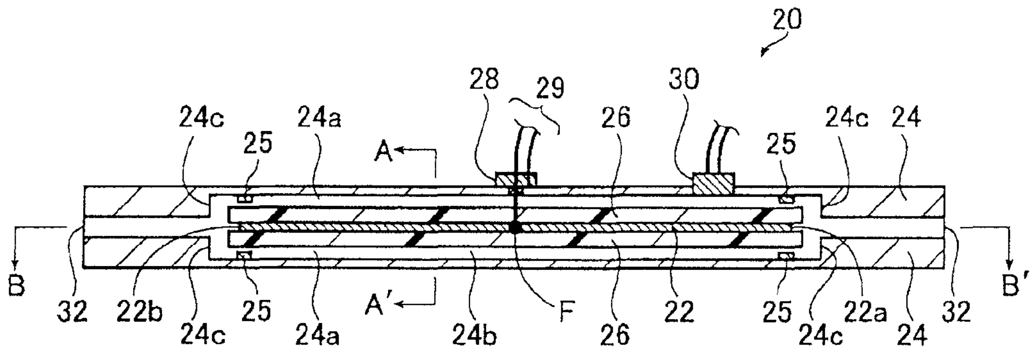
FIG. 2A is a cross-sectional view of a reactor illustrated in FIG. 1.
Figure 2B:
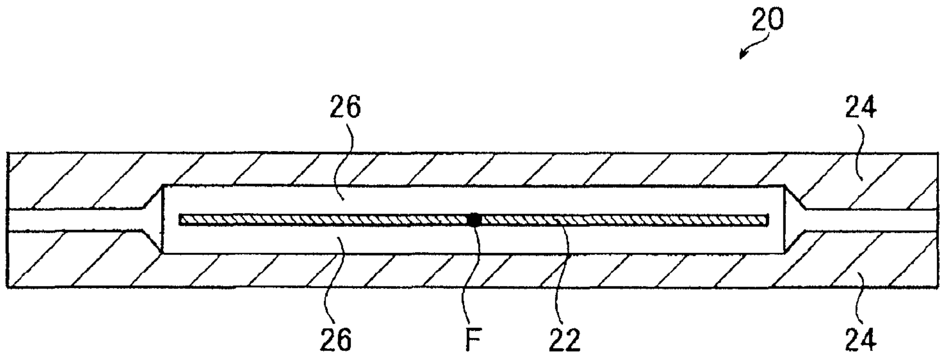
Figure 2C:
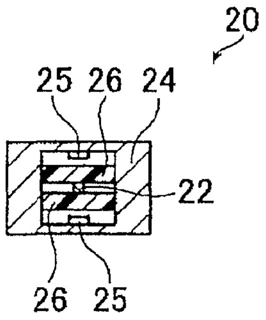
FIG. 2C is a cross-sectional view of FIG. 2A sectioned along Arrow A-A'.

The reactor 20 is illustrated in FIGS. 2A to 2C. FIG. 2A is a cross-sectional side view of the reactor 20. FIG. 2B is a cross-sectional view of the reactor 20 sectioned along Arrow B-B' in FIG. 2A. FIG. 2C is a cross-sectional view of the reactor 20 sectioned along Arrow A-A' in FIG. 2A.

The reactor 20 is a rod-shaped device. The reactor 20 is mainly composed of a liner electrode (first electrode) 22, a pair of grounded electrodes (second electrodes) 24, a pair of dielectrics 26, a feeding connection terminal 28 and an electric field probe 30.

The linear electrode 22 is an electrode elongated in one direction. The linear electrode 22 is disposed in an interior space 24*b* along the wall surfaces of the grounded electrodes 24. The linear electrode 22 is spaced away from the wall surfaces of the grounded electrodes 24 through constant distance. Each of the grounded electrodes 24 has a recess 24*a*. The interior space 24*b* is formed by disposing the recesses 24*a* of the pair of the grounded electrodes 24 to be positioned opposite to each other.

The linear electrode 22 is sandwiched between the pair of the elongated plate-shaped dielectrics 26, and forms a strip line. In the present embodiment, a micro strip line and a center conductor of a coaxial cable may be used instead of the strip line. High conductive material of e.g., silver, copper and aluminium, is preferably used as the linear electrode 22.

The linear electrode 22 is a strip line with length 21. An electric feeding point F is set in a position slightly out-of-alignment with the longitudinal center of the linear electrode 22, specifically, in a position determined by the aforementioned formula (1). As electric power, an AC (alternating-current) signal is applied to the electric feeding point F from an electric feeding line 29 via the feeding connection terminal 28. As hereinafter explained, the electric feeding point F is set in a position slightly out-of-alignment with the longitudinal center of the linear electrode 22 for achieving impedance matching in the electric feeding of the reactor 20. The linear electrode 22 is capable of efficiently generating high voltage because resonance of the lowest-order mode is therein occurred similarly to an AC dipole antenna when half a wave length λ of a transmission signal transmitting through the linear electrode 22 gets matched with the length 21 of the linear electrode 22. The length 21 is an important factor for determining a resonance frequency in the apparatus 10. In the present embodiment, the length 21 is set for effectively generating high voltage at a frequency band of 100 MHz-10 GHz.

Note high heat-resistant dielectric material with low dielectric loss, such as silica glass and ceramic containing alumina and boron nitride, is preferably used as the dielectrics 26.

The pair of the grounded electrodes 24 enclose the linear electrode 22, and are grounded. Specifically, the pair of grounded electrodes 24, 24 are opposed to each other. Additionally, the recesses 24*a*, formed on the inner surfaces of the opposed pair of the grounded electrodes 24 and the grounded electrodes define the interior space 24*b*. The linear electrode 22, sandwitched between the pair of the dielectrics 26, is disposed in the interior space 24*b*. The pair of the dielectrics 26 are therein fixed while making contact with the inner surfaces of the grounded electrode 24. Therefore, the interior space 24*b* is formed for enclosing the linear electrode 22, and the linear electrode 22 is spaced away from the grounded electrode 24.

High-conductive material of e.g., silver, copper and aluminum is preferably used as the grounded electrode 24.

The most portion of the linear electrode 22, excluding the both ends 22*a* and 22*b*, is spaced away from the pair of the earth electrodes 24 by a constant separation distance. A separation distance in each of the both ends 22*a* and 22*b* of the linear electrode 22 is shorter than that in the other portion of the linear electrode 22 excluding the both ends 22*a* and 22*b*. More specifically, discharging protrusions 25 are provided on each of the grounded electrodes 24 for opposing to the both ends 22*a* and 22*b* of the liner electrode 22. Accordingly, the separation distance from the both ends 22*a* and 22*b* of the linear electrode 22 to each of the grounded electrodes 24 is shorter than the aforementioned constant separation distance. Conductive material or high-dielectric material is used as the discharging protrusions 25. Note the discharging protrusions 25 may be provided on the linear electrode 22 not on the grounded electrode 24. The separation distance herein means the shortest distance from an arbitrary position of interest in the linear electrode 22 to each of the grounded electrodes 24. The separation distance from positions in the both ends 22*a* and 22*b* of the linear electrode 22 to each of the grounded electrode 24 is set to be shorter than that from a position in the other portion of the linear electrode 22 excluding the both ends 22*a* and 22*b* to each of the grounded electrodes 24, such that voltage in the both ends 22*a* and 22*b* of the linear electrode 22 is maximized and plasma is efficiently generated therearound.

Note the feeding connection terminal 28 is disposed on one of the earth electrodes 24 for connecting the electric feeding line 29 to the electric feeding point F of the linear electrode 22. Here, the electric feeding line 29 is insulated from the grounded electrode 24 through an insulation member.

Furthermore, the grounded electrodes 24 are opposed to each other, and apertures 32 are formed on the both ends of the reactor 20 (i.e., horizontal ends of the reactor 20 in FIG. 2A). The apertures 32 communicate with the external atmosphere or external apparatus and link to the interior space 24*b*. For example, when the apparatus 10 is used for executing oxidation of NO included in the exhaust gas from e.g., a diesel engine, the exhaust gas is introduced thereto through one of the apertures 32. The introduced NO and the like are oxidized therein using high-voltage plasma. Then, the oxidized NO and the like are discharged to the external atmosphere through the other of the apertures 32. Note diameters of the apertures 32 are set to be extremely smaller than the length 21 of the linear electrode 22 for preventing leakage of an electromagnetic wave generated in the interior space 24*b* to the outside. Specifically, the maximum width of the cross-section D of each aperture 32 is set to be extremely smaller than "$\lambda/2$," which is half the wave length $\lambda$.

The electric field probe 30 is a sensor which detects an electric field in the interior space 24*b* and output a measurement signal proportional to the intensity of the electric field. The electric field probe 30 is disposed in one of the earth electrodes 24. A heretofore known electric field probe is used as the electric field probe 30. The measurement signal, outputted from the electric field probe 30, is transmitted to a control device 40.

The control device 40 is configured to adjust the measurement signal obtained from the electric field probe 30 through predetermined processing and subsequently feed the adjusted signal to the linear electrode 22 as electric power.

The control device 40 is composed of a directional coupler 42, a band-pass filter 44, a wave detector 46, an amplification filter 48, an amplitude modulator 50, a variable phase shifter 52, an amplifier 54 and a control unit 56.

The directional coupler 42 is a section configured to divide the measurement signal, which is outputted from the electric field probe 30, into two components. One of the divided measurement signal components is transmitted to the control unit 56 via the wave detector 46 and the amplification filter 48, whereas the other of the divided measurement signal components is transmitted to the band-path filter 44.

The band-pass filter 44 is used for extracting the wave length of the same frequency band as the resonance frequency out of the measurement signal outputted from the electric field probe 30. For example, the resonance frequency band is preliminarily set. When the resonance frequency is set to be 100 MHz, for instance, the frequency band of the band-pass filter 44 is accordingly set to be 50-150 MHz. An AC signal, obtained by the band-pass filter 44, is transmitted to the amplitude modulator 50.

The amplitude modulator 50 is a section configured to execute amplitude modulation of the AC signal transmitted from the band-pass filter 44 for controlling the generation amount of plasma by varying the duty ratio of the AC signal. For example, when the amplitude modulator 50 is used in an apparatus for executing oxidation of NO (nitric oxide) included in the exhaust gas, the amount of oxidation-processed NO is controlled by varying the generation amount of plasma through the variation of the duty ratio of a signal. The duty ration is set to be higher in proportion to the amount of the discharge gas. In this case, the amplitude modulation frequency is set to be approximately several kHz-1 MHz.

The variable phase shifter 52 is a section configured to execute predetermined phase shift of the amplitude-modulated AC signal. As hereinafter described, when the amplified AC signal is supplied to the electric feeding point F as an electric current (voltage) to be fed, the phase shift, executed by the variable phase shifter 52, is controlled for shifting the phase of the amplified AC signal for the signal to become in phase with an electric current (voltage) in resonance generated in the reactor 20. In other words, the phase shift is controlled for making the amplified AC signal in synchronization with the resonance in the electric field. The amount of the phase shift is set on a basis of the transmission time of the signal transmitting through a line corresponding to the feedback path from the electric field probe 30 to the electric feeding point F and the delay time required for processes.

The amplifier 54 is a section to amplify the phase-shifted AC signal at predetermined-fold magnification and supply the amplified AC signal to the electric feeding point F as an electric current.

In the amplitude modulator 50 and the variable phase shifter 52, amplitude modulation and the phase shift are respectively executed in accordance with a control signal from the control unit 56. The control unit 56 is configured to monitor the measurement signal supplied thereto via the wave detector 46 and the amplification filter 48, determine the amplitude modulation and the phase shift in accordance with the monitoring result, and generate a control signal. In the monitoring processing, for instance, the intensity of the electric field in the resonance frequency is obtained, and a condition of the electric field or a condition of the generated plasma is assessed based on the intensity of the electric field. Furthermore, whether the resonance is increasing or decreasing is estimated.

The wave detector 46 is a section configured to detect the measurement signal based on a reference signal, that is, a preliminarily-set signal having the same frequency as a resonance frequency. The amplification filter 48 amplifies the detected measurement signal, filtering the amplified signal for selectively allowing a predetermined frequency component, and transmit the predetermined frequency component to the control unit 56.

As described above, the present invention is configured to execute the amplitude modulation of the measurement signal measured by the electric field probe 30 which detects the intensity of the electric field in the reactor 20, and feedback the AC signal which is obtained through the phase shift, to the reactor 20 as electric power to be fed.

According to the present invention, the apparatus 10 is configured to generate high-voltage output using a feedback system without including an oscillator. In the rising of the resonance, however, a noise component (e.g., thermal noise) of the amplifier 54 may be fed as a signal component corresponding to the resonance frequency. The signal triggers generation of a weak resonance, and the weak resonance is improved by the electric feeding using the feedback system.

Note it is possible to increase high-voltage output by cooling the surrounding of the grounded electrodes 24 using liquid nitrogen or liquid helium.

Figure 3A:
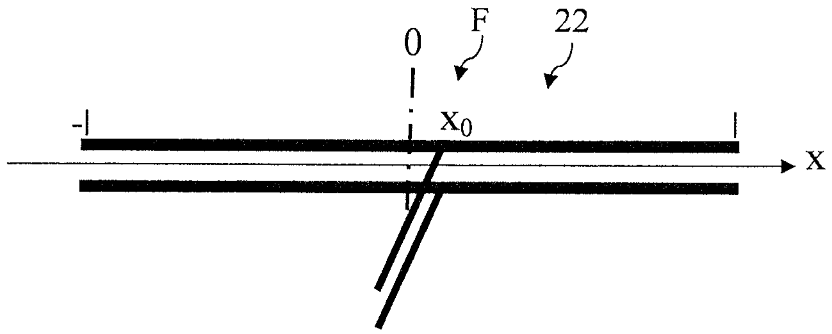
FIGS. 3A and 3B are transmission line models for schematically illustrating a resonant system of linear electrodes in FIG. 1.
Figure 3B:
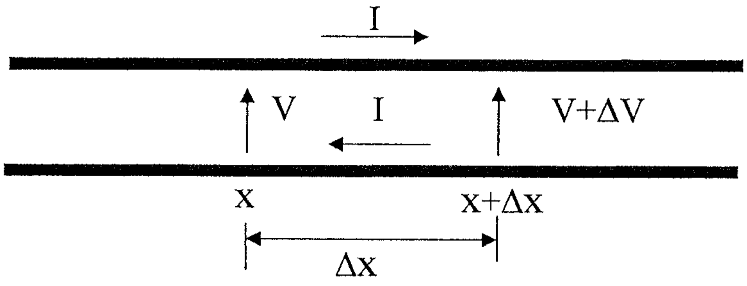

The linear electrode 22, functioning as a resonator of the apparatus 10, will be hereinafter explained in detail using a transmission line model. FIGS. 3A and 3B are diagrams illustrating transmission line models representing a resonance system of the liner electrode 22. As illustrated in FIG. 3A, the transmission line model is represented using a pair of transmission lines parallelly disposed along axes thereof. The position of the electric feeding point F is herein defined as "$x_0$".

As illustrated in FIG. 3B, when voltage at a position x is defined as "V" and voltage at a position x+Δx (i.e., position away from the position x by a distance Δx) is defined as "V+ΔV," the following formula (2) is obtained by a continuity equation. Here, "$I_0(t)$" represents electric current to be supplied to the electric feeding point F whereas the equivalent capacitance C represents capacity per unit length. In the transmission line mode, on the other hand, relation between the equivalent resistance R per unit length of the transmission line and the equivalent inductance L per unit length of the transmission line is represented by the following formula (3). Here, the equivalent capacitance C in the formula (2) is a complex number under the assumption that electric conductivity of plasma is finite. When the energy loss by the equivalent capacitance C is considered to be caused by the loss of plasma (coefficient χ), the following formula (4) is given.

[Formula 2]

$$C\frac{\partial V(t,x)}{\partial t}+\frac{\partial I(t,x)}{\partial x}=I_0(t)\delta(x-x_0) \tag{2}$$

[Formula 3]

$$R\cdot I(t,x)+L\frac{\partial I(t,x)}{\partial t}+\frac{\partial V(t,x)}{\partial x}=0 \tag{3}$$

[Formula 4]

$$C=Cr(l-i\chi) \tag{4}$$

When the aforementioned formulas (2) to (4) are integrated, the following formula (5) is derived. The formula (5) is a quadratic partial differential equation having voltage V as an unknown. In this case, the electric conductivity of plasma is lower than that of the transmission line. Therefore, the equivalent resistance R of the transmission line should not be herein considered. As shown in the following formula (6), the series expansion is herein conducted for a delta function δ(x−x0). In conjunction with this, the series expansion is also conducted for the voltage V as shown in the following formula (7).

[Formula 5]

$$L\cdot Cr\frac{\partial^2 V(t,x)}{\partial t^2}+L\cdot Cr(\chi\omega)\frac{\partial V(t,x)}{\partial t}-\frac{\partial^2 V(t,x)}{\partial x^2}=L\frac{dI_0(t)}{dt}\delta(x-x_0) \tag{5}$$

[Formula 6]

$$\delta(x-x_0)=\sum_{n=0}^{\infty}\left[\xi_n\cos\left(\frac{n\pi x}{l}\right)+\eta_n\sin\left\{\left(n+\frac{1}{2}\right)\frac{\pi x}{l}\right\}\right] \tag{6}$$

$$\text{Here, }\xi_n=\frac{1}{l}\cos\left(\frac{n\pi x_0}{l}\right),\ \eta_n=\frac{1}{l}\sin\left\{\left(n+\frac{1}{2}\right)\frac{\pi x_0}{l}\right\}$$

[Formula 7]

$$V(t,x)=\sum_{n=0}^{\infty}\left[a_n(t)\cos\left(\frac{n\pi x}{l}\right)+b_n(t)\sin\left\{\left(n+\frac{1}{2}\right)\frac{\pi x}{l}\right\}\right] \tag{7}$$

Solution of the formula (5) is herein represented by the following formula (8). Distribution of the voltage V in the transmission line under the lowest-order resonance mode, i.e., the mode of "n=0," is represented by the following formula (9). The following formula (10) more simply represents the formula (9). In response to this, distribution of an electric current is represented by the following formula (11). As is obvious from the formula (10), distribution of the voltage V under the mode of "n=0" corresponds to half a sine-wave, and the absolute value of the voltage where x=±1 (positions in the both ends) is the maximum. Based on this, the apparatus 10 is configured to have the maximum voltage in the both ends 22*a* and 22*b* of the linear electrode 22 (see FIG. 2A) under the lowest-order resonant mode. Accordingly, plasma is easily generated in the space between the end 22*a* and the grounded electrodes 24 and the space between the end 22*b* and the grounded electrodes 24. In addition, as described above, the separation distance from the both ends 22*a* and 22*b* to each of the grounded electrodes 24 is shorter than the separation distance from the other portion of the linear electrode 22 and each of the grounded electrodes 24. Accordingly, plasma is more likely to be generated.

[Formula 8]

$$V(t,x)=\sum_{n=0}^{\infty}\left[\frac{\left(i\omega\frac{\xi_n}{Cr}\right)I_{00}e^{i\omega t}\cos\left(\frac{n\pi x}{l}\right)}{-\omega^2+\left(\frac{n\pi}{l\sqrt{LCr}}\right)^2+i\chi\omega^2}+\frac{\left(i\omega\frac{\eta_n}{Cr}\right)I_{00}e^{i\omega t}\sin\left\{\left(n+\frac{1}{2}\right)\frac{\pi x}{l}\right\}}{-\omega^2+\left\{\left(n+\frac{1}{2}\right)\frac{\pi}{l\sqrt{LCr}}\right\}^2+i\chi\omega^2}\right] \quad (8)$$

Here, $I_0(t)=I_{00}e^{i\omega t}$

[Formula 9]

$$V_{n=0}(t,x)=\frac{\left(i\omega\frac{\eta n}{Cr}\right)I_{00}e^{i\omega t}\sin\left(\frac{\pi x}{2l}\right)}{-\omega^2+\omega_0^2+i\chi\omega^2} \quad (9)$$

[Formula 10]

$$V_{n=0}(t,x)=V_{00}e^{i\omega t}\frac{\sin\left(\frac{\pi x}{2l}\right)}{\sin\left(\frac{\pi x_0}{2l}\right)} \quad (10)$$

Here, $V_{00}$ is input voltage in the electric feeding point of $x=x_0$.

[Formula 11]

$$I_{n=0}(t,x)=i\frac{Z_{00}}{Z_c}I_{00}e^{i\omega t}\frac{\cos\left(\frac{\pi x}{2l}\right)}{\sin\left(\frac{\pi x_0}{2l}\right)} \quad (11)$$

Here, $Z_{00}$ is characteristic impedance of the electric feeding line whereas $Z_c$ is characteristic impedance of the transmission line.

Furthermore, the impedance matching in the electric feeding point F will be hereinafter explained.

In general, input impedance $Z_{in}$, seen on the transmission line from the input side to the load side, is represented by the following formula (12). In the present invention, the term "load" means plasma discharge load. Additionally, "$Z_r$" represents load impedance of the discharge load, whereas "$Z_c$" represents characteristic impedance of the transmission line. Furthermore, "γ" represents a propagation constant of a system, and is represented by an equation "$\gamma=i\cdot(\pi/2l)\cdot(1-i\cdot\chi/2)$"

In this case, a condition for the impedance matching at an electric feeding point of "$x=x_0$" is represented by the following formula (13).

In this case, "$Z_{00}$" represents input impedance on the electric feeding line. Additionally, "$Z_{inp}$" represents input impedance in an x-axial positive direction (rightward direction) from the electric feeding point of "$x=x_0$" in FIG. 2A, whereas "$Z_{inn}$" represents input impedance in an x-axial negative direction (leftward direction) from the electric feeding point of "$x=x_0$" in FIG. 2A. Based on this, it is possible to determine if the impedance matching is possible by computing both $Z_{inp}$ and $Z_{inn}$ using the formula (12) and by checking if a solution satisfying the formula (13) is found, specifically, by checking if a pair of a position of the electric feeding point F and a loss coefficient is found.

[Formula 12]

$$Z_{in}=Z_c\cdot\frac{Z_r+Z_c\tanh(\gamma x)}{Z_c+Z_r\tanh(\gamma x)} \quad (12)$$

$$\text{Here, } Z_c=\sqrt{\frac{L}{C}}\approx\sqrt{\frac{L}{Cr}}\left(1+i\frac{\chi}{2}\right)$$

$$\gamma=\sqrt{-\omega^2L\cdot C}\approx i\omega\sqrt{L\cdot Cr}\left(1-i\frac{\chi}{2}\right)$$

[Formula 13]

$$\frac{1}{Z_{00}}=\frac{1}{Z_{inp}}+\frac{1}{Z_{inn}} \quad (13)$$

Figure 4:
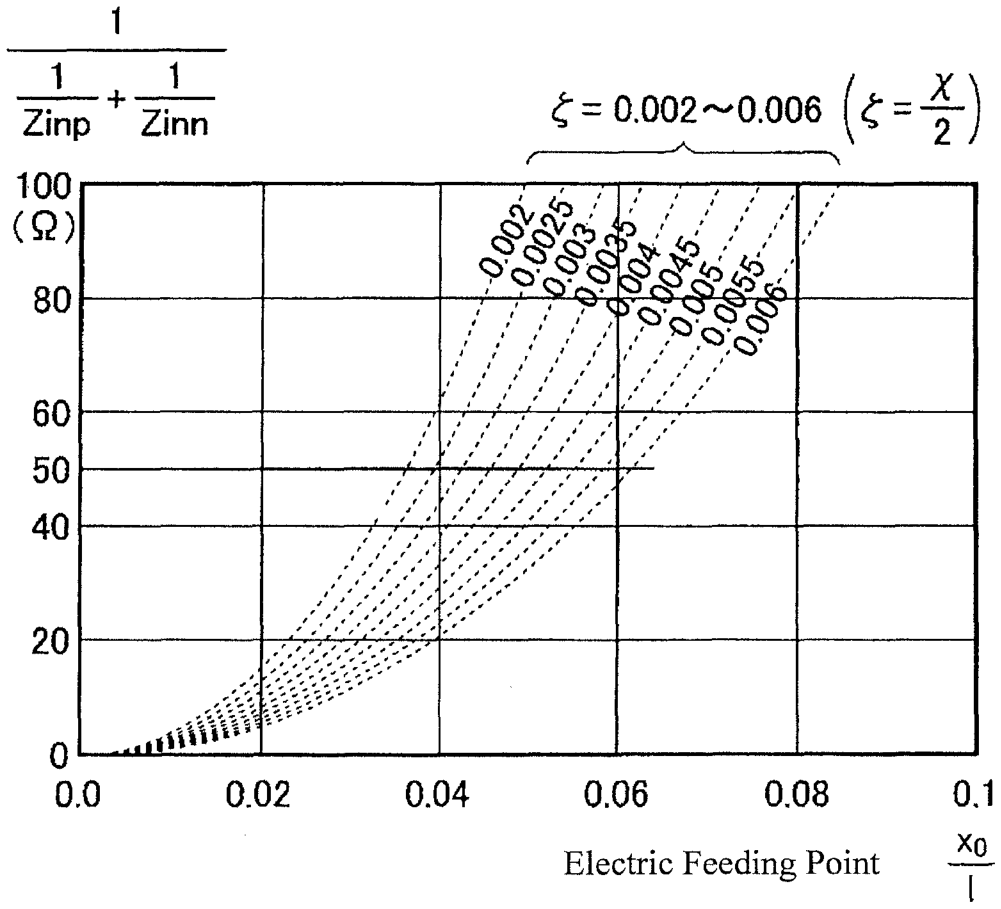
FIG. 4 is a diagram for illustrating a relation between a power feeding position and input impedance when the transmission line models illustrated in FIGS. 3A and B are used.

FIG. 4 illustrates a relation between an electric feeding position and input impedance when the transmission line models, illustrated in FIGS. 3A and 3B, are used. In this case, "$Z_{cr}$" and "$Z_r$" are set as follows: "$Z_{cr}=100\Omega$" and "$Z_r=1018\Omega$ (i.e., substantially infinity)". The following equation is established "

$\omega=(\pi/2l)\cdot(L\cdot C_r)^{-(1/2)}$".

In general, impedance of an electric feeding line is set to be 50Ω. Therefore, when it is checked if the position $x_0$ of the electric feeding point F, in which the impedance is 50Ω, is found while the value of $\chi/2$ is varied in a range of 0.002-0.006, FIG. 4 indicates existence of the position $x_0$ in which the impedance is 50Ω. When the impedance matching is executed with the impedance of 50Ω, the position $x_0$ of the electric feeding point F is represented by a value of "$x_0/l$ ("l" is half the length of the linear electrode 22)." The value of $x_0/l$ is equal to or less than 0.1. Accordingly, when χ is determined, it is possible to uniquely compute the out-of-alignment amount $x_0$ as shown in the formula (1). Furthermore, it is possible to determine the position of the electric feeding point F based on the out-of-alignment amount $x_0$. The position $x_0$ of the electric feeding point F for achieving the impedance matching depends on the equivalent inductance L, the equivalent capacitance C and the equivalent resistance R in the resonance system of the reactor 20. Values thereof vary depending on conditions of use. Therefore, it is desirable to determine the position $x_0$ of the electric feeding point F in the manufacturing process of the apparatus 10, specifically, after a condition of use of the reactor 20 is confirmed.

Note the position $x_0$ (i.e., the out-of-alignment amount) of the electric feeding point F is computed as follows. First, "$\eta_n$" where n=0, defined by the formula (6), is given to the formula (9), and the formula (9) is organized using "$\omega=\omega0=(\pi/2l)\cdot(L\cdot C_r)^{-(1/2)}$". The following formula (14) is thus derived. In this case, the following relation is established "$V_{n=0}(t,x_0)=V_{00}$." Therefore, the formula (14) is represented by the following formula (15). Furthermore, when "$Q=1/\chi$" is given to the formula (15), the following formula (16) is derived. Thus, the position $x_0$ of the electric feeding point F is represented by the aforementioned formula (1) using the formula (16).

[Formula 14]

$$V_{n=0}(t,x)=\frac{1}{\chi}\cdot\frac{2}{\pi}\cdot\frac{Z_{cr}}{Z_{00}}V_{00}e^{i\omega t}\sin\left(\frac{\pi x_0}{2l}\right)\sin\left(\frac{\pi x}{2l}\right) \quad (14)$$

-continued

[Formula 15]

$$\frac{1}{\chi}\cdot\frac{2}{\pi}\cdot\frac{Z_{cr}}{Z_{00}}V_{00}\cdot\left\{\sin\left(\frac{\pi x_0}{2l}\right)\right\}^2 = V_{00} \tag{15}$$

[Formula 16]

$$Q = \frac{l}{\chi} = \frac{\pi}{2}\cdot\frac{Z_{00}}{Z_{cr}}\cdot\frac{1}{\left\{\sin\left(\frac{\pi x_0}{2l}\right)\right\}^2} \tag{16}$$

According to the present invention, a measurement signal, measured by the electric field probe 30, is processed and the processed signal is again fed as electric power to the linear electrode 22 in which resonance is generated. Accordingly, amplitude is amplified by the resonance. Therefore, it is possible to easily generate high voltage that the maximum voltage thereof is $10^2$-$10^5$V in the voltage distribution represented by the formula (10). Especially, the position of the electric feeding position F, in which the impedance matching is achieved, is limited. The position of the electric feeding position F is desirably set to be out-of-alignment with the center position at the out-of-alignment amount $x_0$ defined by the formula (1). For the position, the impedance matching is achieved and it is accordingly possible to efficiently feed electric power. In other words, it is possible to easily generate high voltage in which $10^2$ to $10^5$V is reached as the maximum voltage thereof without using a conventionally used oscillator.

The high-voltage plasma generating apparatus according to the present invention has been explained in detail. However, the present invention is not limited to the aforementioned embodiment. Obviously, a variety of changes and modifications may be arbitrarily done for the aforementioned embodiment without departing from the scope of the present invention. It is possible to apply the present invention to a variety of apparatuses for executing etching and film formation using the atmospheric plasma to be used in a semiconductor production process, in addition to the apparatus for executing oxidization of NO (nitric oxide) included in the exhaust gas to be exhausted by e.g., a diesel engine. Alternatively, it is possible to apply the present invention to a gas laser generating apparatus.

What is claimed is:

1. A high-voltage plasma generating apparatus for generating plasma using high voltage of $10^2$-$10^5$V, comprising:

a first electrode which receives, as electric power, feeding of an alternating-current signal including a signal component of a predetermined frequency from an electric feeding point, to generate high voltage due to resonance which is occurred upon the feeding of the alternating-current signal, a second electrode which is grounded and spaced away from the first electrode and encloses the first electrode, to define a space around the first electrode, and a control device configured to adjust an alternating-current signal including a signal component of a frequency which is identical to a resonance frequency of the first electrode, to be fed to the first electrode, and wherein the control device includes:

an electric field probe which measures intensity of an electric field to be generated in the space between the first electrode and the second electrode;

a filter which filters a measurement signal outputted from the electric field probe, to obtain an alternating-current signal of a band of the predetermined frequency;

a variable phase shifter which shifts a phase of the alternating-current signal to synchronize the alternating-current signal to the resonance of the electric field to be generated in the space when the alternating-current signal is fed to the first electrode as the electric power; and an amplifier which amplifies the phase-shifted alternating-current signal, wherein the measurement signal outputted from the electric field probe is supplied through in an order of the filter, the variable phase shifter, and the amplifier to the first electrode as the electric power.

2. The high-voltage plasma generating apparatus according to claim 1, wherein the control device further includes an amplitude modulator which modulates amplitude of the alternating-current signal in order to control increase or decrease of the plasma to be generated in the space, and the measurement signal outputted from the electric field probe is supplied through in an order of the filter, the amplitude modulator, the variable phase shifter, and the amplifier to the first electrode as the electric power.

3. The high-voltage plasma generating apparatus according to claim 2, wherein the control device detects the measurement signal outputted from the electric field probe, monitors a condition of the electric field or the generated plasma, and controls at least one of the variable phase shifter and the amplitude modulator in accordance with a monitoring result.

4. The high-voltage plasma generating apparatus according to claim 1, wherein the first electrode is a linear electrode elongated in a direction, the space defined by the second electrode is elongated around the first electrode, and separation distance from both ends of the linear electrode to the second electrode is shorter than separation distance from other portion of the linear electrode excluding the both ends to the second electrode.

5. The high-voltage plasma generating apparatus according to claim 4, wherein the electric feeding point of the linear electrode is out-of-alignment with a longitudinal center position of the linear electrode and an out-of-alignment amount of $x_0$ is represented by the following formula (1):

$$\frac{x_0}{2l} = \frac{l}{\pi}\sin^{-1}\left(\sqrt{\frac{\pi Z_{00}}{2QZ_{cr}}}\right) \tag{1}$$

where l is half a length of the linear electrode, $Z_{00}$ is characteristic impedance of a feeding line for feeding the electric power to the feeding point, $Z_{cr}$ is a real part of characteristic impedance $Z_c$ when the linear electrode is a transmission line, $Q=1/\chi$, and $\chi$ is a coefficient indicative of energy loss of equivalent capacitance C during a generation of plasma in the high-voltage plasma generating apparatus.

6. A high-voltage plasma generating apparatus for generating plasma using high voltage of $10^2$-$10^5$V, comprising:

a first electrode which receives, as electric power, feeding of an alternating-current signal including a signal component of a predetermined frequency from an electric feeding point, to generate high voltage due to resonance which is occurred upon the feeding of the alternating-current signal, a second electrode which is grounded and spaced away from the first electrode and encloses the first electrode, to define a space around the first electrode, and a control device configured to adjust an alternating-current signal including a signal component of a frequency which is identical to a resonance frequency of the first electrode, to be fed to the first electrode, the control device being electrically coupled to the first electrode, the control device including:

an electric field probe which measures intensity of an electric field to be generated in the space between the first electrode and the second electrode;

a directional coupler which divides a measurement signal outputted from the electric field probe;

a filter which filters a portion of the measurement signal outputted from the directional coupler, to obtain an alternating-current signal of a band of the predetermined frequency;

an amplitude modulator which modulates amplitude of the alternating-current signal outputted from the filter in order to control increase or decrease of the plasma to be generated in the space;

a variable phase shifter which shifts a phase of the alternating-current signal outputted from the amplitude modulator to synchronize the alternating-current signal to the resonance of the electric field to be generated in the space when the alternating-current signal is fed to the first electrode as the electric power; and an amplifier which amplifies the phase-shifted alternating-current signal outputted from the variable phase shifter, wherein the measurement signal outputted from the electric field probe is supplied through in an order of the directional coupler, the filter, the amplitude modulator, the variable phase shifter, and the amplifier to the first electrode as the electric power to be inputted.

7. The high-voltage plasma generating apparatus according to claim 6, the control device further including a wave detector which detects a portion of the measurement signal based on a preliminarily-set signal having the resonance frequency;

an amplification filter which amplifies a detected measurement signal outputted from the wave detector and filters the amplified detected measurement signal; and a control unit which monitors a signal outputted from the amplification filter and determines both of an amplitude modulation of the alternating-current signal by the amplitude modulator and a phase shift of the alternating-current signal by the variable phase shifter in accordance with the monitoring result.

* * * * *